United States Patent [19]

Fockens

[11] Patent Number: 4,572,976

[45] Date of Patent: Feb. 25, 1986

[54] TRANSPONDER FOR ELECTROMAGNETIC DETECTION SYSTEM WITH NON-LINEAR CIRCUIT

[75] Inventor: Tallienco W. H. Fockens, Eibergen, Netherlands

[73] Assignee: N.V. Nederlandsche Apparatenfabriek Nedap, De Groenlo, Netherlands

[21] Appl. No.: 558,579

[22] Filed: Dec. 6, 1983

[30] Foreign Application Priority Data

Dec. 10, 1982 [NL] Netherlands ............... 8204802

[51] Int. Cl.$^4$ ............... H01J 19/82; H05K 1/04
[52] U.S. Cl. ............... 307/524; 307/271; 307/219.1; 307/494; 340/572
[58] Field of Search ............... 307/522–526, 307/271, 219.1, 499; 340/572

[56] References Cited

U.S. PATENT DOCUMENTS

| | | | |
|---|---|---|---|
| 4,021,705 | 5/1977 | Lichtblau | 361/402 |
| 4,274,083 | 6/1981 | Tomoeda | 340/171 R |
| 4,274,089 | 6/1981 | Giles | 340/572 |
| 4,308,530 | 12/1981 | Kip et al. | 340/572 |
| 4,481,428 | 11/1984 | Charlot, Jr. | 307/219.1 |

FOREIGN PATENT DOCUMENTS 2750863  5/1978  Fed. Rep. of Germany.
  47513 11/1976  United Kingdom.

*Primary Examiner*—Stanley D. Miller
*Assistant Examiner*—Richard Roseen
*Attorney, Agent, or Firm*—Fleit, Jacobson, Cohn & Price

[57] ABSTRACT

A detection wafer with a non-linear circuit for an electromagnetic detection system wherein two different transmission frequencies are used, comprising a resonant circuit connected to a non-linear element forming from the transmission frequencies, a third frequency to be detected. The non-linear element forms part of an amplifying semiconductor circuit connected to a supply battery and having an input circuit coupled to the resonant circuit, and an output circuit comprising a coil magnetically coupled to the coil of the resonant circuit, the resonant frequency bandwidth of the resonant circuit comprising both transmission frequencies and the frequency to be detected.

8 Claims, 5 Drawing Figures

U.S. Patent     Feb. 25, 1986     4,572,976
FIG. 1A PRIOR ART
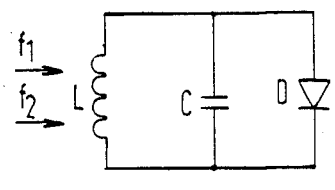
FIG. 1B PRIOR ART
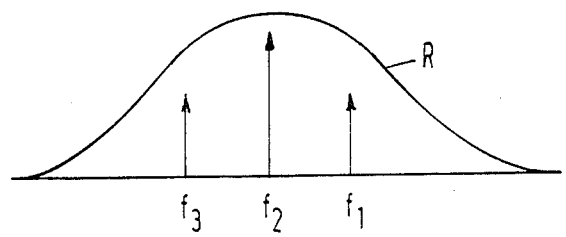
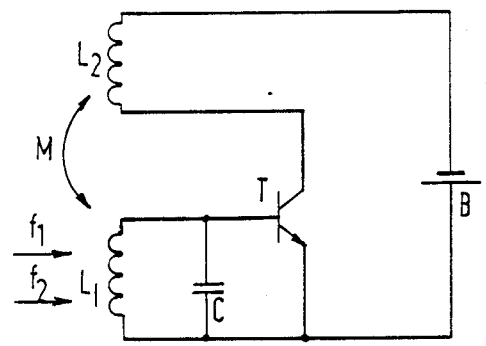
FIG. 2
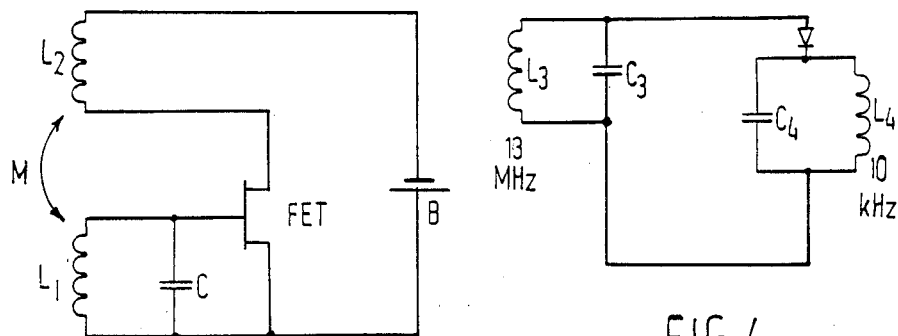
FIG. 3     FIG. 4

A # TRANSPONDER FOR ELECTROMAGNETIC DETECTION SYSTEM WITH NON-LINEAR CIRCUIT

BACKGROUND

The invention relates to a detection wafer with a non-linear circuit for an electromagnetic detection system wherein two different transmission frequencies are used, comprising a resonant circuit connected to a non-linear element forming from the transmission frequencies a third frequency to be detected. A similar detection wafer is known from German patent application No. 2,750,863. This known detection wafer is adapted to form, starting from two signals having frequencies $f_1$ and $f_2$, respectively, and transmitted in an interrogation zone by a transmitter associated with the detection system, a signal having a third frequency $f_3$. This third signal can be detected and then indicates the presence of a detection wafer in the interrogation zone. The known detection wafer is provided for that purpose with a resonant circuit comprising a non-linear element, such as a diode. This diode forms from the received signals having frequencies $f_1$ and $f_2$ a number of distortion components. The frequencies $f_1$ and $f_2$ are chosen in such a manner that these frequencies both lie within the resonant frequency bandwidth of the resonant circuit.

The frequency $f_1$ may e.g. coincide with the peak of the resonance characteristic of the resonant circuit and the frequency $f_2$ may be slightly higher than the frequency $f_1$ and be chosen in such a manner that at the level of $f_2$ the resonant characteristic has decreased to a relatively slight degree.

If furthermore the signal having the frequency $f_1$ has the largest amplitude of the distortion components, the signal having a frequency $f_3 = 2f_1 - f_2$ is the strongest representative in the current through the coil of the resonant circuit, for this frequency likewise lies in a range where the resonance characteristic of the resonant circuit has decreased only slightly. The presence of a signal having the frequency $f_3$, which indicates the presence of a detection wafer in the interrogation zone, can now be simply detected with a narrow band filter with central frequency $f_3$.

Although the known detection wafer is quite satisfactory for many applications there is nevertheless sometimes a need for a stronger signal having the frequency $f_3$, so that there may be a greater chance of detection. Further, it is desirable that both the known detection wafer and the detection wafers providing a greater chance of detection can be employed together with the same detection system used already for the known detection wafers.

OBJECTS AND SUMMARY OF THE INVENTION

Consequently, it is an object of the invention to provide a detection wafer satisfying this need.

To this end, in a first embodiment of the invention, a detection wafer of the above described type is characterized in that the non-linear element forms part of an amplifying semiconductor circuit connected to a supply battery and having an input circuit coupled to the resonant circuit, and an output circuit comprising a coil magnetically coupled to the coil of the resonant circuit, the resonant frequency bandwidth of the resonant circuit comprising both transmission frequencies and the frequency to be detected.

In a second embodiment of the invention, a detection wafer of the above described type is characterized in that the resonant circuit has a resonant frequency bandwidth comprising either of the two transmission frequencies and the frequency to be detected and that the non-linear element is connected in series to a second resonant circuit the resonant frequency bandwidth of which comprises the second transmission frequency, which is substantially lower than the first transmission frequency and the frequency to be detected.

BRIEF DESCRIPTION OF THE DRAWINGS

Some embodiments of the invention will now be described, by way of example, with reference to the accompanying drawings, in which:

FIG. 1A diagrammatically shows the electric circuit of the known detection wafer, and FIG. 1B shows the location of the frequencies occurring relative to the resonance characteristic of the resonant circuit;

FIG. 2 shows a first embodiment of an electric circuit for a detection wafer according to the invention;

FIG. 3 shows a variant of FIG. 2; and

FIG. 4 shows a second embodiment of a circuit for a detection wafer according to the invention.

DETAILED DESCRIPTION

FIG. 1A shows a resonant circuit comprising a coil L and a capacitor C to which there is also connected a non-linear element in the form of a diode D. This electric circuit is mounted in known manner in a detection wafer, not shown. Such a wafer can be attached, e.g. for preventing shop lifting, to the goods present in a shop. In an interrogation zone created for instance near the shop exit, a transmitter associated with the detection system generates a signal having frequencies $f_1$ and $f_2$. These frequencies are received by the resonant circuit wherein a number of distortion components is formed as a result of the presence of the non-linear element. Of these components, that component is used for the detection which, besides $f_1$ and $f_2$, is most strongly represented in the signal produced in the resonant circuit.

FIG. 1B shows the possible location of the frequencies $f_1$ and $f_2$ relative to the resonance characteristic R. The frequency $f_1$, in the embodiment shown, coincides with the peak of the resonance characteristic and has a larger amplitude than the slightly higher frequency $f_2$, having such a value that at $f_2$ the resonance characteristic relative to the peak value still has a relatively high value, so that the signal having frequency $f_2$ encounters relatively little attenuation.

Due to the selected values of the frequencies $f_1$ and $f_2$ and of the amplitudes of the signals having these frequencies, of the signals generated in the resonant circuit, the signal having a frequency $f_3 = 2f_1 - f_2$ is present most strongly of all distortion components. Unlike $f_2$, $f_3$ is lower than $f_1$ in this case.

As already observed, there is a need in certain applications for a stronger signal having the third frequency, so that a greater chance of detection is created.

This is in particular the case when goods of a high value, as e.g. fur coats, have to be protected.

Furthermore, it often occurs in big department stores that, besides goods for which the normal chance of detection is deemed sufficient, there are also goods for which an increased chance of detection is desired, otherwise using the same detection system.

FIG. 2 diagrammatically shows an embodiment of a circuit for a detection wafer according to the invention which provides for a greater chance of detection when used in conjunction with the known detection system, without requiring any change in the detection system often already present.

Detection wafers according to the invention can thus be used together with the known detection wafers in one and the same place of business. The circuit shown in FIG. 2 comprises again a resonant circuit composed of a coil $L_1$ and a capacitor C. The resonance characteristic may have the same form and location as the resonance characteristic shown in FIG. 1B. Also the frequencies $f_1$, $f_2$ and $f_3$ may have the same location. In this case, however, as a non-linear element, instead of a diode D, the base-emitter junction of a transistor T is connected across the resonant circuit. The transistor T is connected in common emitter circuitry. Supply voltage for the transistor is derived from a battery B, the one terminal of which is connected to the emitter and the other terminal through a second coil $L_2$ to the collector of the transistor.

At a sufficiently high level of the signals generated in the resonant circuit $L_1C$ by the received signals having the frequency $f_1$ and $f_2$, the base-emitter junction of the transistor becomes conductive during the signal peaks, so that a pulsed current is produced in the coil $L_2$. Since the second coil $L_2$ is magnetically coupled to the first coil $L_1$, as indicated by the double arrow M, the signals already generated in the first coil are amplified. The voltage threshold prevailing across the base-emitter junction effects a strong non-linear distortion, so that also an amplified signal having the frequency $f_3$ is produced in the resonant circuit $L_1C$ and is transmitted.

The magnetic coupling between the coils can be effected in various manners. For instance, the coils $L_1$ and $L_2$ may be wound collectively on a ferrite core. It is also possible to design the coils $L_1$ and $L_2$ as flat coils mounted concentrically.

As long as the circuit of the detection wafer is not present in the interrogation zone, no current flows into this circuit and the battery is not loaded. When modern miniature batteries are used a service life of more than 5 years can therefore be expected, so that the use of a battery is no drawback.

It is observed that, as is the case with the known detection wafer, the detection wafer according to the invention can also be used if the signal having the frequency $f_1$ or the signal having the frequency $f_2$ or both signals are modulated by the transmitter. This modulation can then be found back in the signal having the frequency $f_3$.

Besides, the detection wafer according to the invention can be used in a detection system using a single interrogation frequency, or one or two sweeping interrogation frequencies. Such detection systems are known per se and will therefore not be further described herein. When used in such detection systems, a detection wafer according to the invention also provides for an amplified output signal and hence a greater chance of detection, on condition that the resonant frequency is adjusted to the frequency(ies) used in these systems.

It is observed that various modifications of the embodiment described will be readily apparent to one skilled in the art. For instance, instead of the transistor T, a Darlington circuitry can be employed, or a field effect transistor. Also a tunnel diode or another suitable semiconductor element is quite suitable for use therein.

An embodiment with a field effect transistor FET is shown in FIG. 3, for the sake of completeness.

Such modifications are deemed to fall within the scope of the invention.

FIG. 4 shows an embodiment of electric circuit for a detection wafer. This circuit comprises a first resonant circuit $L_3C_3$ the resonant frequency bandwidth of which comprises e.g. the frequencies $f_2$ and $f_3$, as shown in FIG. 1. Further, a second resonant circuit $L_4C_4$ is present, having a much lower resonance range. The circuit $L_3C_3$ may have e.g. a resonance frequency of about 13 MHz, whereas the circuit $L_4C_4$ may have a resonance frequency of about 10 kHz. If such a detection wafer is introduced in an interrogation field comprising the frequency $f_2$ and a low frequency $f_4$ of e.g. 10 kHz, then the non-linear element again forms a frequency $f_3$ to be detected, lying within the resonant frequency bandwidth of the circuit $L_3C_3$.

Since a low-frequency signal of e.g. about 10 kHz can be transmitted as a stronger signal than can a high-frequency signal, such as $f_1$, there is thus also obtained a relatively strong signal having the frequency $f_3$ to be detected, thus increasing the chance of detection.

A detection wafer according to FIG. 4 can furthermore be used conveniently for detection systems of the known type, i.e. detection systems wherein the two transmission frequencies lie within the resonance range of the resonant circuit, since in that case the low frequency resonant circuit can be considered to be shorted.

I claim:

1. A detection wafer with a non-linear circuit for an electromagnetic detection system wherein two different transmission frequencies are used, comprising:
   a resonant circuit including a coil and a capacitor providing a certain bandwidth of resonance;
   a non-linear element connected to said resonant circuit forming from the two different transmission frequencies a third frequency to be detected, said non-linear element forming part of an amplifying semiconductor circuit, said amplifying semiconductor circuit connected to a supply battery and having an input circuit coupled to said resonant circuit and an output circuit including a coil magnetically coupled to said coil of said resonant circuit, the bandwidth of said resonant circuit comprising said two different transmission frequencies and said third frequency to be detected.

2. A detection wafer according to claim 1, characterized in that the semiconductor circuit comprises a transistor with three electrodes, a control electrode, a second and a third electrode, said control electrode and said second electrode being connected across said resonant circuit, said second electrode and said third electrode forming part of said output circuit.

3. A detection wafer according to claim 2, characterized in that said transistor is connected in a common emitter arrangement.

4. A detection wafer according to claim 2, characterized in that the transistor is a field effect transistor.

5. A detection wafer according to claim 1, characterized in that the semiconductor circuit is a Darlington transistor circuit.

6. A detection wafer according to claim 1, characterized in that the coil of the resonant circuit and the coil of the output circuit of the semiconductor circuit are flat coils mounted concentrically.

7. A detection wafer according to claim 1, characterized in that the coil of the resonant circuit and the coil of the output circuit of the semiconductor circuit are jointly wound on a ferrite rod.

8. A detection wafer with a non-linear circuit for an electromagnetic detecton system wherein first, second and third transmission frequencies are used, comprising a first resonant circuit having a coil and a capacitor providing a certain bandwidth of resonance, said first resonant circuit connected to a non-linear element forming from two selected transmission frequencies a frequency to be detected, said two selected transmission frequencies being chosen from said first, second and third transmission frequencies, characterized in that said first resonant circuit has a bandwidth comprising said first and second transmission frequencies and the frequency to be detected, and that the non-linear element is connected in series between said first and a second resonant circuit providing another bandwidth of resonance, said another bandwidth comprising said third transmission frequency which is substantially lower than said first and second transmission frequencies and the frequency to be detected.

* * * * *